(12) United States Patent
Ramananda

(10) Patent No.: US 7,870,542 B1
(45) Date of Patent: Jan. 11, 2011

(54) CALLING SYSTEM, METHOD AND COMPUTER PROGRAM PRODUCT

(75) Inventor: Gubbi Ramachandra Ramananda, Doddabommasandra (IN)

(73) Assignee: McAfee, Inc., Santa Clara, CA (US)

( * ) Notice: Subject to any disclaimer, the term of this patent is extended or adjusted under 35 U.S.C. 154(b) by 1316 days.

(21) Appl. No.: 11/398,087

(22) Filed: Apr. 5, 2006

(51) Int. Cl.
*G06F 9/45* (2006.01)
(52) U.S. Cl. ....................................... 717/140
(58) Field of Classification Search .......... 717/130–158
See application file for complete search history.

(56) References Cited

U.S. PATENT DOCUMENTS

| | | | | |
|---|---|---|---|---|
| 5,634,046 | A * | 5/1997 | Chatterjee et al. | 712/227 |
| 5,968,169 | A * | 10/1999 | Pickett | 712/239 |
| 6,321,275 | B1 * | 11/2001 | McQuistan et al. | 719/330 |
| 6,550,058 | B1 * | 4/2003 | Wynn | 717/158 |
| 6,560,692 | B1 * | 5/2003 | Kudo et al. | 712/23 |
| 6,691,306 | B1 * | 2/2004 | Cohen et al. | 717/139 |
| 6,973,563 | B1 * | 12/2005 | Sander | 712/242 |
| 7,191,291 | B2 * | 3/2007 | Hooker | 711/132 |
| 7,203,798 | B2 * | 4/2007 | Kawamoto | 711/123 |
| 7,287,283 | B1 * | 10/2007 | Szor | 726/26 |
| 2004/0064681 | A1 * | 4/2004 | Jourdan et al. | 712/225 |
| 2004/0186959 | A1 * | 9/2004 | Kawamoto | 711/132 |
| 2005/0097578 | A1 | 5/2005 | Rangarajan | 719/330 |
| 2006/0206880 | A1 * | 9/2006 | Barraclough et al. | 717/140 |
| 2006/0218537 | A1 * | 9/2006 | Aroya | 717/130 |
| 2006/0218540 | A1 * | 9/2006 | Edwards et al. | 717/146 |
| 2007/0130448 | A1 * | 6/2007 | Jourdan et al. | 712/218 |

FOREIGN PATENT DOCUMENTS

WO 2005/006119 1/2005

* cited by examiner

*Primary Examiner*—Anna Deng
(74) *Attorney, Agent, or Firm*—Zilka-Kotab, PC

(57) ABSTRACT

A calling system, method and computer program product are provided. In use, at least one argument is pushed on a stack. In addition, a size of the at least one argument is pushed on the stack. Further, the size of the at least one argument is popped off the stack, and the stack is cleaned.

19 Claims, 5 Drawing Sheets

CALLING SYSTEM, METHOD AND COMPUTER PROGRAM PRODUCT

FIELD OF THE INVENTION

The present invention relates to calling conventions, and more particularly to calling functions.

BACKGROUND

Program calls are substantially used in applications and/or processes to transfer control to a procedure, program, routine, subroutine, etc. They are typically called within the code of the application and/or process utilizing any desired programming language. For example, calling a routine may consist of specifying the routine name (internally function pointer) and, optionally, parameters to be utilized by the called routine.

There are many different methods that are currently used in processing a program call. One example is _cdecl. Cdecl is a program for encoding and decoding type declarations of the C programming language. Specifically, a caller (e.g. the function or entity making the program call) pushes arguments on to a stack and cleans up after returning from the callee (e.g. the function or entity being called by the caller).

In the above cdecl process, the function being called is typically only responsible for processing its own data. Specifically, the function being called will push and pop its own registers, variables, etc. off the stack, but will not participate in cleaning up the stack for the caller. Further, one problem with such process is that if the same function is called more than once, the epilog code (i.e. code added by the compiler at the end of the function) may be duplicated in all relevant places.

Another method currently used in processing program calls is _stdcall. In stdcall, the caller pushes the arguments on to the stack and the callee cleans up the stack. For example, if stdcall is used with the thiscall calling convention, the ECX register is used to pass the this pointer. One problem with stdcall is that the callee does not know the parameters being used for clean up, and therefore the callee cannot pass variable arguments.

Yet another method currently used in processing program calls is _fastcall. In fastcall, the caller passes the first two 32 bit arguments utilizing registers. The rest of the data is passed through a stack. The callee then cleans up the stack. The fastcall method, however, unfortunately results in the assembler source code (ASM) not being able to use the registers unless the registers are pushed on to the stack, thus reducing the speed in which the call is processed.

There is thus a need for overcoming these and/or other problems associated with the prior art.

SUMMARY

A calling system, method and computer program product are provided. In use, at least one argument is pushed on a stack. In addition, a size of the at least one argument is pushed on the stack. Further, the size of the at least one argument is popped off the stack, and depending on this value, the stack is cleaned.

DETAILED DESCRIPTION

Figure 1:
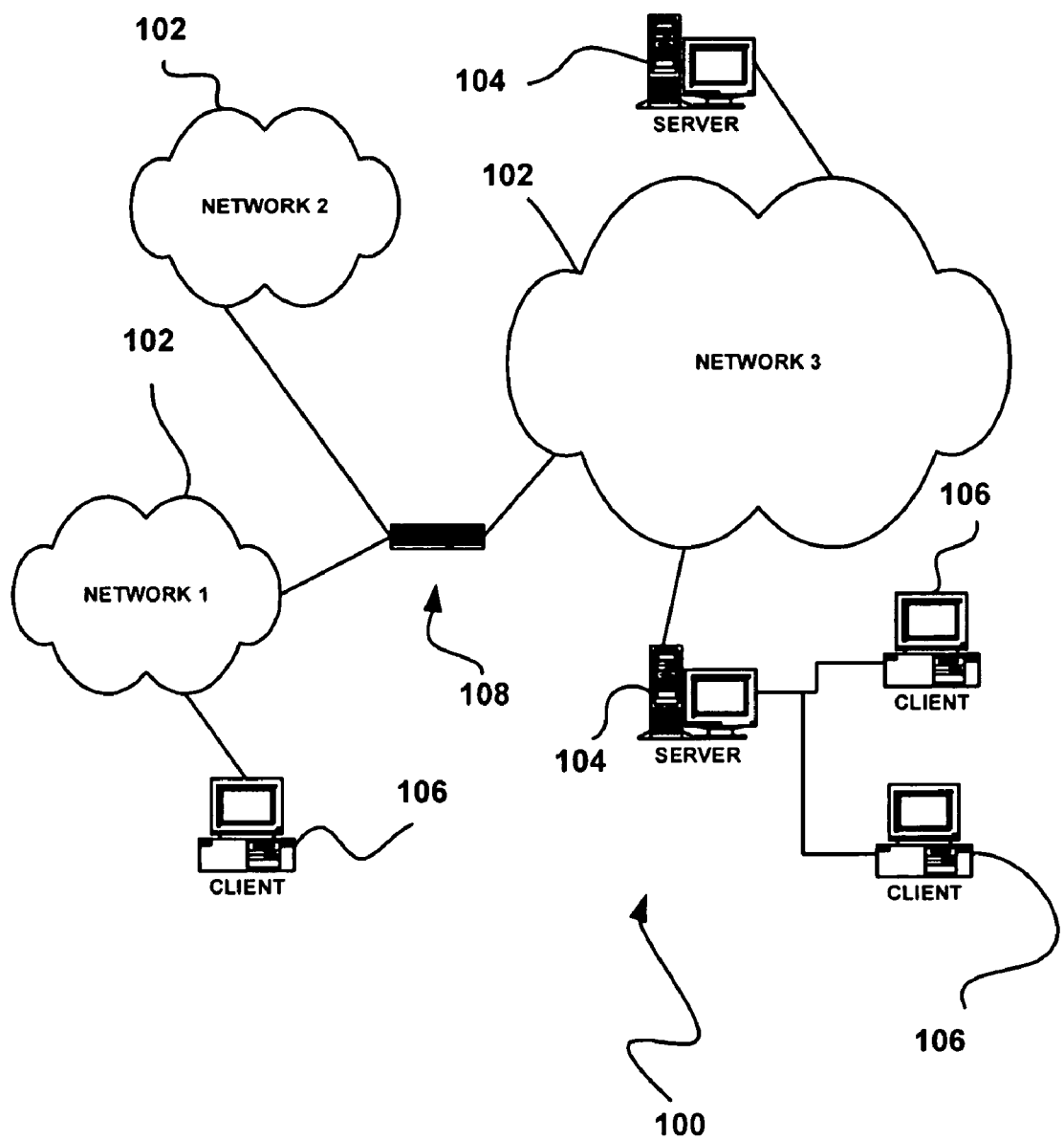
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are server computers 104 which are capable of communicating over the networks 102. Also coupled to the networks 102 and the server computers 104 is a plurality of client computers 106. Such server computers 104 and/or client computers 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
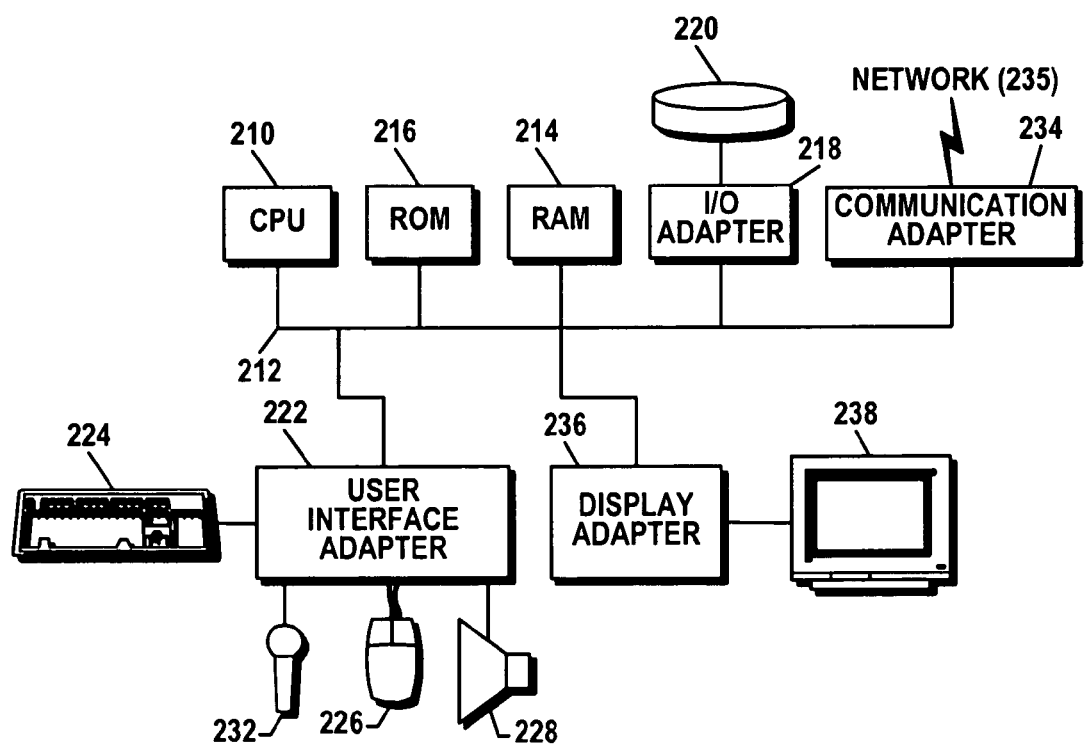
FIG. 2 shows a representative hardware environment that may be associated with the server computers and/or client computers of FIG. 1, in accordance with one embodiment.

FIG. 2 shows a representative hardware environment that may be associated with the server computers 104 and/or client computers 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Our course, the various embodiments set forth herein may be implemented utilizing hardware, software, or any desired combination thereof. For that matter, any type of logic may be utilized which is capable of implementing the various functionality set forth herein.

Figure 3:
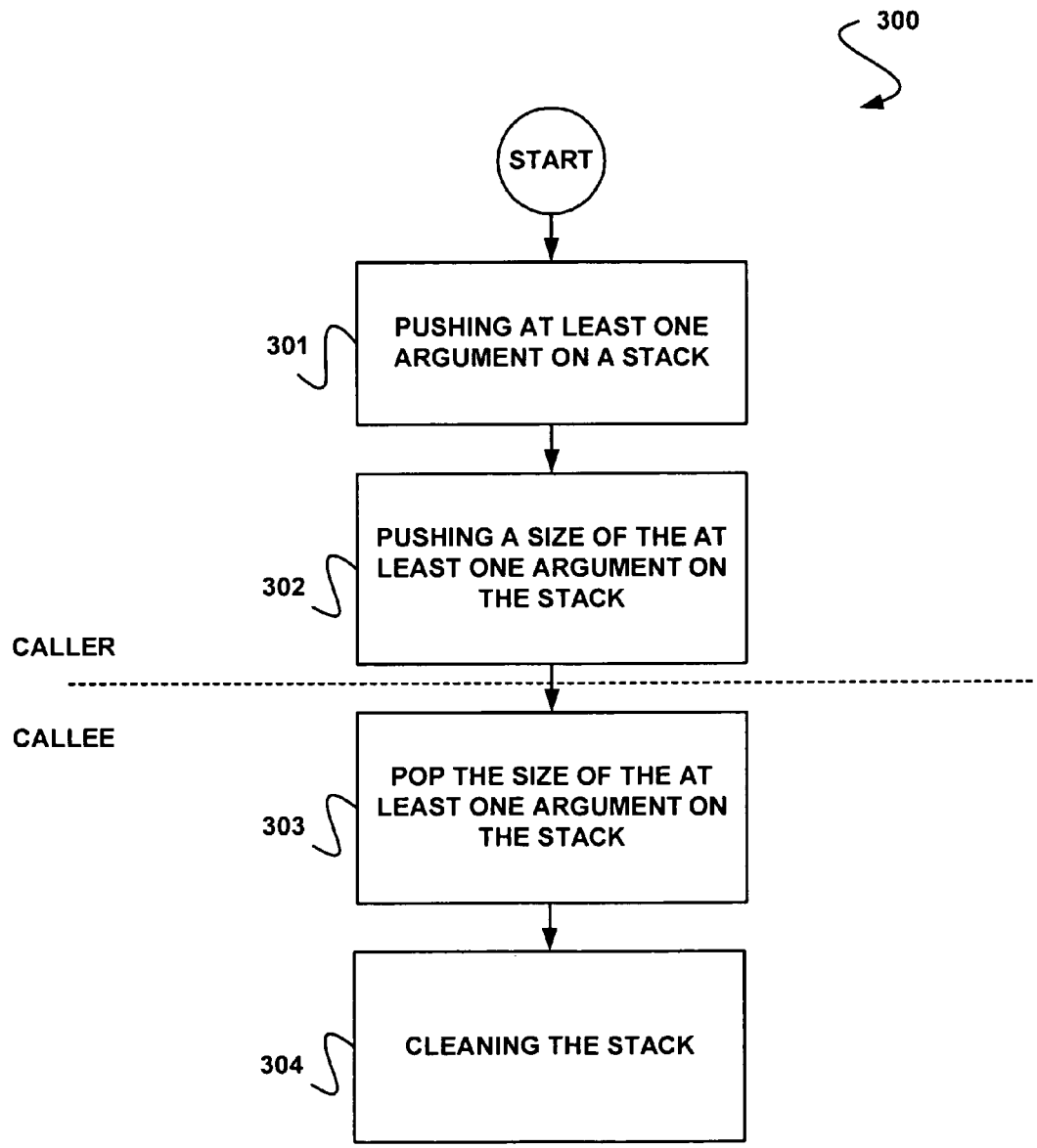
FIG. 3 shows a method for calling a function, in accordance with one embodiment.

FIG. 3 shows a method 300 for calling a function, in accordance with one embodiment. As an option, the method 300 may be implemented in the context of the architecture and environment of FIGS. 1 and/or 2. Of course, however, the method 300 may be carried out in any desired environment.

As shown in operation 301, at least one argument is pushed on to a stack. The argument may be pushed on the stack by storing the argument on the stack or using any other technique that results in the at least one argument being on the stack. Further, in the context of the present description, the argument may refer it any parameter associated with the function being called. For example, the argument may include any data required for the function to run, such as for example, data the function will act upon. The argument may also include any type of data, such as an integer, float, character and/or any other value capable of being passed to the function being called. The argument may also include a variable argument. In addition, the stack may include a data structure capable of storing data. For example, the stack may include a data structure in which data items are removed from the stack in the reverse order from that in which they are added to the stack. Of course, any type of data structure capable of storing and allowing access to data may be used.

Next, a size of the at least one argument is pushed on to the stack, as indicated in operation 302. The argument size may include a number of bytes of the at least one argument pushed on to the stack in operation 301. Thus, if multiple arguments are pushed on to the stack in operation 301, the size of all of the arguments combined will be pushed on to the stack in operation 302. In one embodiment, if all of the arguments pushed on to the stack are of a 32 bit length, a count command may be utilized in pushing the argument size on to the stack. In another embodiment, the argument size pushed on to the stack may be an immediate variable. The immediate variable may be a value that is provided in the code of the function being called. For example, the immediate variable may be a local_size generated by a compiler with respect to the compiling of the called function.

As another option, the argument size may be stored in a dedicated register, and may further be restored when needed for providing faster access and therefore better performance. Specifically, the argument size may be stored in a temporary register and may be read from such temporary register instead of having to be read and eventually cleaned from the stack. As shown, operations 301 and 302 may both be carried out by a caller of the function (i.e. the function or entity that is calling the called function), but, of course, may be performed by any function capable of accessing and pushing such data on to the stack.

Further, the size of the at least one argument may be popped off the stack, as shown in operation 303. The argument size may be popped off the stack by removing the argument size from the stack or using any other technique that results in the argument size being removed from the stack. Specifically, in one embodiment, the argument size may be popped off the stack after the called function has run. The argument size may, in another embodiment, be the top element on the stack, such that it may be the first element to be popped off the stack. Again, the argument size that is popped off the stack in operation 303 may identify the size of the argument(s) that has been pushed on to the stack.

Still yet, the stack may be cleaned. See operation 304. The stack may be cleaned by popping all of the arguments utilized by the called function off the stack. Specifically, in one embodiment, the argument size popped off the stack in operation 303 may be utilized to identify the size of the argument(s) still remaining on the stack and may further be utilized to pop such arguments off the stack. For example, a stack pointer may be incremented by the argument size such that it points to the first argument on the stack that is associated with the called function. The pointer may then be utilized such that all data located on the stack above such pointer may be popped off the stack.

In this way, the stack may be cleaned of any data that has been utilized by the called function. As an option, operations 303 and 304 may be carried out by the callee of the function (i.e. the function or entity being called). Of course, such operations may be performed by any function or entity capable of accessing and popping such data off the stack. In one embodiment, the method 300 may be utilized in exception handling. Of course, the method 300 may be utilized for any desired purpose where functions are called.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
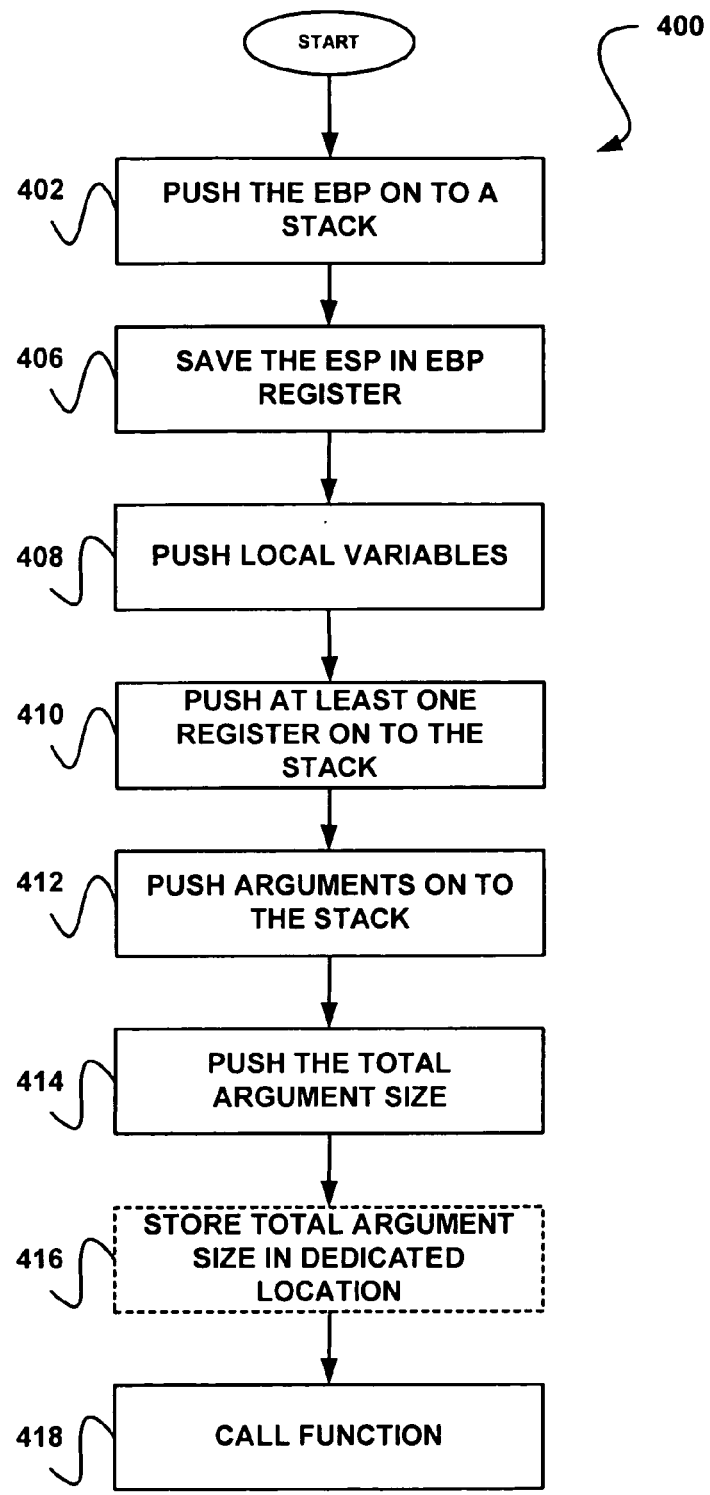
FIG. 4 shows a method for calling a function, in accordance with another embodiment.

FIG. 4 shows a method 400 for calling a function, in accordance with another embodiment. As an option, the method 400 may be implemented in the context of the architecture and environment of FIGS. 1-3. Of course, however, the method 400 may be carried out in any desired environment. It should also be noted that the aforementioned definitions may apply during the present description.

As shown in operation 402, an extended base pointer (EBP) is pushed on to the stack. The EBP includes a pointer which points to the base of an activation record associated with the called function. The activation record may include the information with which the called function is associated (e.g. the return address, parameters, automatic local variables, etc.). Thus, an EBP register may be provided for storing the data located in the activation record, and the EBP may be a pointer to the beginning section of such data (which may be used by the called function).

Next, an extended stack pointer (ESP) may be saved in the EBP register, as in operation 406. Thus, the ESP may point at the same location as the EBP (e.g. the first on the stack to be initially used by the called function). Optionally, the ESP may be saved in the EBP register prior to pushing the EBP on the stack in operation 402. In use, the ESP may point to the location where the function call starts.

Further, local variables associated with the called function may be pushed on to the stack. See operation 408. The local variables may include any variables directly associated with the called function such as, for example, variables located within the called function itself. Of course, any type of local variables capable of being used by a called function may be pushed, as desired.

Further, as shown in operation 410, at least one register associated with the called function may be pushed on to the stack. Such may include the contents of any register used by the called function to store data. The register may also be utilized by a function associated with any arguments pushed on to the stack, as will be described below with respect to operation 412. In one embodiment, the at least one register of operation 410 may include, but is not limited to an extended account register (EAX), extended base register (EBX), extended count register (ECX), and/or an extended data register (EDX).

Still yet, arguments may be pushed on to the stack, as in operation 412. As described with respect to FIG. 3, such arguments may include any parameter associated with the function being called such as, for example, any data required for the function to run, etc. Further, in one embodiment, the arguments may include any data that the function expects to receive.

As shown in operation 414, the total argument size is pushed on to the stack. For instance, if multiple arguments are pushed on to the stack in operation 412, the size of all of the arguments combined is pushed on to the stack in operation 414. As described above with respect to FIG. 3, a count command or an immediate variable may be utilized in pushing the argument size on to the stack in operation 414. As also described with respect to FIG. 3, and as another option (in lieu of or in addition to operation 414), a dedicated register may optionally be utilized for storing and allowing fast access to the argument size, such that the argument does not have to pushed on to the stack. See operation 416.

Thereafter, the function may be called, as indicated in operation 418. The function may be called such that the running of the function is initiated. In particular, the function may be called in operation 418 utilizing any and/or all of the data and registers pushed on to the stack in operations 402-416.

For example, if the called function is thiscall, the ECX may be used to pass the this pointer to the called function. In addition, the EDX may be used to pass the argument size to the called function. Of course, any registers may be utilized for passing data from the stack to the called function. Further, the called function may itself call other functions, thus repeating the method 400. Thus, the method 400 may support any number of embedded function calls.

In one embodiment, the operations 402-416 in method 400 may be performed during compile time by the caller of the function (e.g. the function or entity calling the function), but of course may be called by any function or entity capable of pushing such data on to the stack. In use, the method 400 may optionally provide, in one embodiment, a way for calling functions such that (1) epilog code (e.g. code added to the end of a function by the compiler) is not duplicated for all calling functions, (2) variable argument passing is supported, and (3) registers may be utilized for enhancing the speed of the called function.

Figure 5:
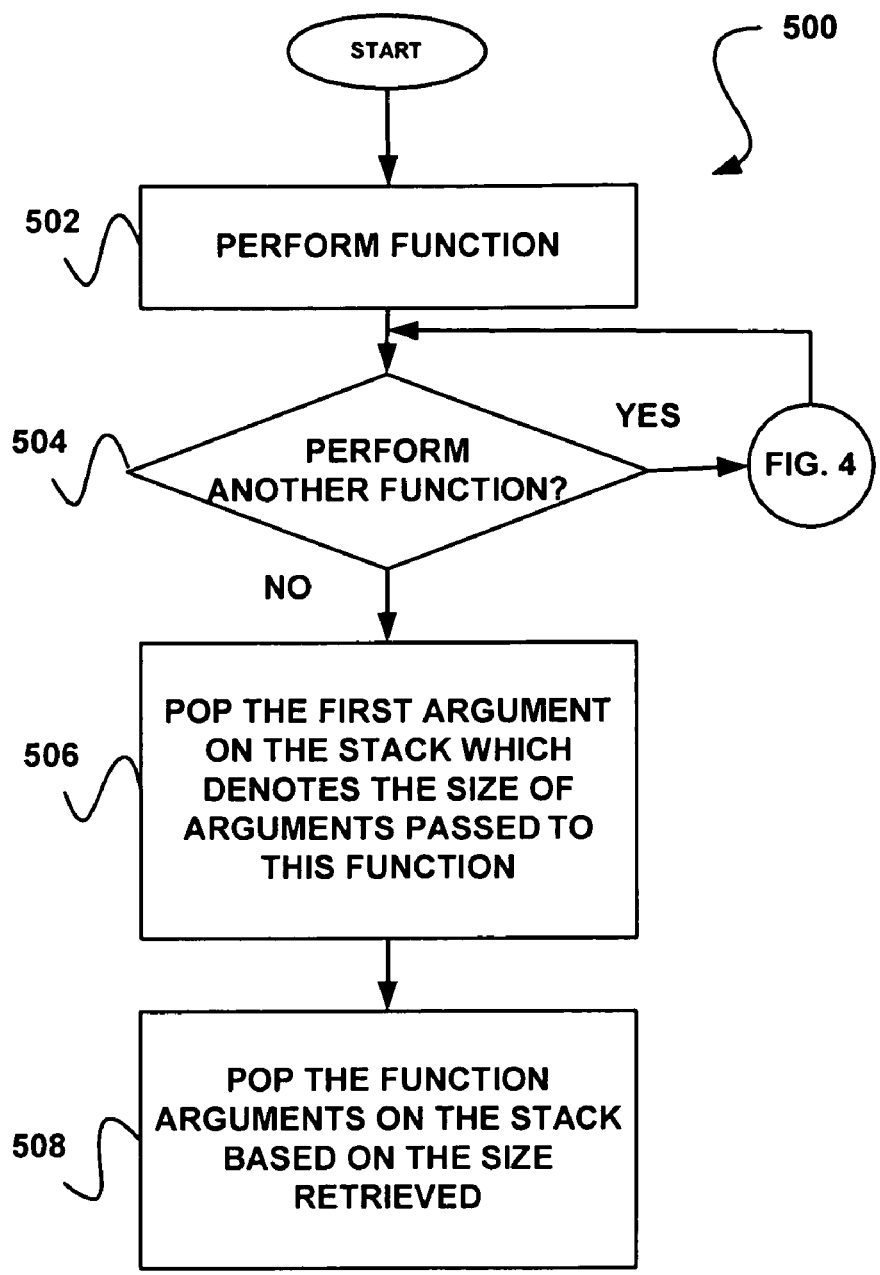
FIG. 5 shows a method for cleaning up a stack associated with a function call, in accordance with yet another embodiment.

FIG. 5 shows a method 500 for cleaning up a stack associated with a function call, in accordance with yet another embodiment. As an option, the method 500 may be implemented in the context of the architecture and environment of FIGS. 1-4. Of course, however, the method 500 may be carried out in any desired environment. It should also be noted that the aforementioned definitions may apply during the present description.

As shown in operation 502, a called function is performed. The called function may be, for instance, the called function described above with respect to FIG. 4. Of course, the called function may be any called function that has utilized data stored on a stack.

During the called function, it is also determined whether another function has been called. See operation 504. If another function has been called, the method 500 may add data associated with that function to the stack, such as for example, utilizing the method described with respect to FIG. 4. Thus, each function embedded within the called function may be performed in a similar manner.

After the called function and any of its own embedded called functions have been performed, the first argument on the stack is popped off the stack, where the first argument denotes the size of arguments passed to the called function. See operation 506. The first argument may also indicate the size of the arguments associated with the called function that are stored on the stack. Based on the argument size retrieved in operation 506, the remaining function arguments may be popped off the stack, as shown in operation 508.

Specifically, the argument size popped off the stack in operation 506 may be utilized to identify the size of the argument(s) still remaining on the stack and may further be utilized to pop such arguments off the stack. For example, a stack pointer may be incremented by the argument size, an all data located on the stack above such pointer may be popped off the stack. In this way, the stack may be cleaned of any data on the stack that has been utilized by the called function. As an option, operations 502-508 of method 500 may be performed by the callee of the function (e.g. the function or entity being called).

Table 1 shows one exemplary embodiment of the way in which method 500 may be utilized to clean a stack.

TABLE 1

Function1( char c, int i, float f)
{
}
    //If this is called as Function1('x', 1234, 33.3344), then the following
may be the assembler source code by the calling function
    push 33.3344    // This occupies 8bytes
    push 1234       // This occupies 4bytes
    push 'x'        // This occupies 4bytes
    push 16         // Total argument size (8+4+4)
    //The function is called
    //On the callee side, during clean-up, it retrieves the argument size
from the stack and increments the stack pointer by that many bytes.
    pop eax         //pop top value (argument size value=16) and store value
    add esp, eax    in eax
                    // pop all the arguments from stack. Here instead of eax,
                    // _ARG_SIZE could be used, where _ARG_SIZE is an
                    // immediate variable denoting the size of arguments
                    defined by
                    // the compiler
                    // add is used since the stack grows towards lower addresses Of course, such example is set forth for illustrative purposes only and should not be construed as limiting in any manner whatsoever.

As shown in Table 1, arguments that are to be passed to the called function (i.e. Function1) for it to run are pushed on to the stack (e.g. 33.3344; 1234; 'x'). After such arguments are pushed on to the stack, the total size of the arguments is pushed on to the stack (e.g. 16). In this way, the total argument size is located at the top of the stack such that it may be retrieved first during clean-up of the stack.

After the called function has run, the argument size value may be popped and stored in the EAX. The argument size value may then be read from the EAX and added to the ESP. In the current example shown in Table 1, the ESP may be incremented by 16.

As a result, the ESP may point to the bottommost argument located on the stack that is associated with the called function. The called function may then utilize this pointer to pop all remaining arguments off the stack that are associated with the called function. Specifically, any data located above the ESP may be removed from the stack and discarded. In this way, the stack may be cleaned of any data already utilized by the called function.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method executed by a processor comprising the steps of:
    pushing at least one argument on a stack;
    pushing a size of the at least one argument on the stack, wherein the size of the at least one argument pushed on the stack denotes a size of arguments passed to a called function;
    popping the size of the at least one argument on the stack, wherein the size of the at least one argument popped off the stack is utilized to identify remaining arguments on the stack and to pop the remaining arguments off the stack;
    incrementing a stack pointer by the size of the at least one argument popped off the stack in order to point to a first argument on the stack associated with the called function; and
    utilizing the stack pointer to pop all data located on the stack above the stack pointer off the stack;
    wherein the stack is cleaned by popping all arguments utilized by the called function off the stack based on the popped size of the at least one argument.

2. The method of claim 1, wherein the pushing is carried out by a caller.

3. The method of claim 1, wherein the popping and cleaning are carried out by a callee.

4. The method of claim 1, wherein the size of the at least one argument includes a number of bytes of the at least one argument.

5. The method of claim 1, further comprising, prior to the pushing, pushing an extended base pointer on the stack.

6. The method of claim 5, further comprising storing an extended stack pointer in the extended base pointer.

7. The method of claim 6, wherein the extended stack pointer points to an object on the stack.

8. The method of claim 6, further comprising pushing local variables on the stack.

9. The method of claim 6, further comprising pushing at least one register on the stack.

10. The method of claim 9, wherein the at least one register is utilized in a function associated with the at least one argument.

11. The method of claim 9, wherein the at least one register includes at least one of an extended account register, an extended base register, an extended count register, and an extended data register.

12. The method of claim 1, further comprising calling a function associated with the argument prior to cleaning the stack.

13. The method of claim 1, wherein the cleaning includes popping the at least one argument on the stack utilizing the size of the at least one argument.

14. The method of claim 1, wherein the popping the size of the at least one argument on the stack includes adding the size to the stack pointer such that the stack pointer points to the first argument.

15. The method of claim 14, wherein the stack pointer is utilized for popping the at least one argument on the stack.

16. The method of claim 1, wherein the at least one argument is a variable argument.

17. A computer program product embodied on a non-transitory computer readable medium, comprising:
    computer code for pushing at least one argument on a stack;
    computer code for pushing a size of the at least one argument on the stack, wherein the size of the at least one argument pushed on the stack denotes a size of arguments passed to a called function;
    computer code for popping the size of the at least one argument on the stack, wherein the size of the at least one argument popped off the stack is utilized to identify remaining arguments on the stack and to pop the remaining arguments off the stack;
    computer code for incrementing a stack pointer by the size of the at least one argument popped off the stack in order to point to a first argument on the stack associated with the called function; and
    computer code for utilizing the stack pointer to pop all data located on the stack above the stack pointer off the stack;
    wherein the computer program product is operable such that the stack is cleaned by popping all arguments utilized by the called function off the stack based on the popped size of the at least one argument.

18. A system, comprising:
    a processor for:
    pushing at least one argument on a stack;
    pushing a size of the at least one argument on the stack, wherein the size of the at least one argument pushed on the stack denotes a size of arguments passed to a called function;
    popping the size of the at least one argument on the stack, wherein the size of the at least one argument popped off the stack is utilized to identify remaining arguments on the stack and to pop the remaining arguments off the stack;
    incrementing a stack pointer by the size of the at least one argument popped off the stack in order to point to a first argument on the stack associated with the called function; and
    utilizing the stack pointer to pop all data located on the stack above the stack pointer off the stack;
    wherein the system is operable such that the stack is cleaned by popping all arguments utilized by the called function off the stack based on the popped size of the at least one argument.

19. The method of claim 1, wherein the size of the at least one argument pushed on the stack indicates the size of the arguments associated with the called function that are stored on the stack.

* * * * *